United States Patent
Li

(10) Patent No.: US 9,686,172 B2
(45) Date of Patent: Jun. 20, 2017

(54) METHOD AND APPARATUS OF DETERMINING POLICY AND CHARGING RULES BASED ON NETWORK RESOURCE UTILIZATION INFORMATION

(75) Inventor: Xiangyang Li, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 761 days.

(21) Appl. No.: 13/985,354

(22) PCT Filed: Jan. 4, 2012

(86) PCT No.: PCT/IB2012/000153
§ 371 (c)(1),
(2), (4) Date: Aug. 14, 2013

(87) PCT Pub. No.: WO2012/110862
PCT Pub. Date: Aug. 23, 2012

(65) Prior Publication Data
US 2013/0326061 A1    Dec. 5, 2013

(30) Foreign Application Priority Data

Feb. 14, 2011 (CN) .......................... 2011 1 0038453

(51) Int. Cl.
*G06F 15/173* (2006.01)
*H04L 12/26* (2006.01)
(Continued)

(52) U.S. Cl.
CPC ...... *H04L 43/0876* (2013.01); *H04L 12/1407* (2013.01); *H04M 15/66* (2013.01);
(Continued)

(58) Field of Classification Search
CPC ................................................ H04L 43/0876
(Continued)

(56) References Cited

U.S. PATENT DOCUMENTS

2002/0143911 A1* 10/2002 Vicente ................. H04L 29/06
                                                          709/223
2009/0182883 A1*  7/2009 Giaretta ................ G06Q 40/00
                                                          709/228
(Continued)

FOREIGN PATENT DOCUMENTS

| CN | 101232385 A | 7/2008 |
| CN | 101272257 A | 9/2008 |

OTHER PUBLICATIONS

3rd Generation Partnership Project; Technical Specification Group Services and System Aspects; Policy and charging control architecture (Release 11); 2GPP TS 23.203 V11.0.1, pp. 1-137, Jan. 2011.
(Continued)

*Primary Examiner* — Jason Recek
(74) *Attorney, Agent, or Firm* — Fay Sharpe, LLP

(57) ABSTRACT

The present invention provides a solution for determining a QoS policy and/or charging policy based on network resource utilization information in an LTE network. As compared to the current 3GPP policy and charging control architecture, the solution of the present invention determines a QoS policy and/or charging policy based on network resource utilization information in combination with existing input information, thereby making policy and charging control more flexible.

9 Claims, 4 Drawing Sheets

(51) Int. Cl.
*H04L 12/14* (2006.01)
*H04M 15/00* (2006.01)

(52) U.S. Cl.
CPC ....... *H04M 15/80* (2013.01); *H04M 15/8016* (2013.01); *H04M 15/8027* (2013.01); *H04L 12/1489* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 2009/0305701 | A1* | 12/2009 | Giaretta | H04L 12/5692 455/435.1 |
| 2010/0150003 | A1 | 6/2010 | Andreasen et al. | |
| 2012/0117235 | A1* | 5/2012 | Castro Castro | H04L 12/14 709/224 |
| 2012/0246325 | A1* | 9/2012 | Pancorbo Marcos | H04L 12/2602 709/227 |
| 2013/0114408 | A1* | 5/2013 | Sastry | H04W 28/02 370/231 |

OTHER PUBLICATIONS

International Search Report for PCT/IB2012/000153 dated May 31, 2012.

\* cited by examiner

METHOD AND APPARATUS OF DETERMINING POLICY AND CHARGING RULES BASED ON NETWORK RESOURCE UTILIZATION INFORMATION

FIELD OF THE INVENTION

The present invention relates to communication networks, and more particularly, to solutions for determining a QoS policy and a charging policy based on network resource utilization information.

BACKGROUND OF THE INVENTION

3GPP has defined some policy and charging control architectures for use in LTE networks. In these architectures, a policy and charging rule function (PCRF) implements policy and charging control based on the input information from a subscriber profile repository (SPR), an application function (AF), and a policy charging and enforcement function (PCEF).

However, existing 3GPP policy and charging control architectures fail to consider solutions which determine and dynamically update QoS policies and/or charging policies with the help of network resource utilization information, such as radio resource utilization information, equipment resource utilization information, and backhaul resource utilization information, etc.

SUMMARY OF THE INVENTION

Based on the above considerations, the present invention provides a solution for determining a QoS policy and/or charging policy based on network resource utilization information in an LTE network.

To implement the technical solution of the present invention, a network resource manager is introduced. The network resource manager monitors network resource utilization information in real time, and interacts with network equipment (e.g., a PCRF) in the current 3GPP policy and charging control architecture to provide the network equipment with the network resource utilization information of the network for policy and charging control.

According to an embodiment of the present invention, there is provided a method of retrieving and performing a QoS policy in a policy and charging enforcement function of a communication network. The method includes the steps of: sending an IP-CAN session establishment request to a policy and charging rule function in response to an IP-CAN bearer establishment request from a user equipment; receiving an IP-CAN session establishment acknowledgment message from the policy and charging rule function, wherein the IP-CAN session establishment acknowledgment message comprises network resource utilization information and the QoS policy determined according to the network resource utilization information; performing the QoS policy; sending an IP-CAN bearer establishment acknowledgment message to the user equipment.

According to another embodiment of the present invention, there is provided a method of determining a QoS policy in a policy and charging rule function of a communication network. The method includes the steps of: sending a first request to a network resource manager in response to an IP-CAN session establishment request from a policy and charging enforcement function, wherein the first request is utilized to request network resource utilization information; receiving a first response from the network resource manager, wherein the first response comprises the network resource utilization information; determining the QoS policy based on the network resource utilization information in the first response; sending an IP-CAN session establishment acknowledgment message to the policy and charging enforcement function, wherein the IP-CAN session establishment acknowledgment message comprises the QoS policy and the network resource utilization information.

According to another embodiment of the present invention, there is provided a method of providing network resource utilization information in a network resource manager of a communication network. The method includes the steps of: receiving a first request from a policy and charging rule function, wherein the first request is utilized to request the network resource utilization information; and sending the collected network resource utilization information to the policy and charging rule function via a first response.

According to another embodiment of the present invention, there is provided a method of determining a charging policy in an online charging server of a communication network. The method includes the steps of: receiving an online charging request from a policy and charging enforcement function, wherein the online charging request comprises network resource utilization information; determining the charging policy based on the network resource utilization information in the online charging request; allocating quota for service requested by a user equipment based on remaining credit of the user equipment and the charging policy; and sending the allocated quota to the policy and charging enforcement function via an online charging response.

As compared to the current 3GPP policy and charging control architecture, the solution of the present invention determines a QoS policy and/or charging policy based on network resource utilization information in combination with existing input information, thereby making policy and charging control more flexible. For example, when network resource utilization ratio is low, the operator can provide better QoS and cheaper discounted tariff plan to stimulate more user equipments to use the network resource. When the network resource utilization ratio is high, the operator can downgrade the network QoS and apply more expensive tariff plan to limit the number of user equipments accessing the network so as to avoid network congestion.

Various aspects of the present invention will become more apparent with the following detailed description of the embodiments.

BRIEF DESCRIPTION OF THE DRAWINGS

The above and other features of the present invention will become more apparent after reading the following detailed description of non-limiting embodiments, with reference to the accompanying drawings, wherein below.

Identical or similar reference signs represent identical or similar steps or devices throughout the accompanying drawings.

DETAILED DESCRIPTION OF PREFERRED EMBODIMENTS

The present invention will be described hereinafter in greater detail in connection with the accompanying drawings.

Figure 1:
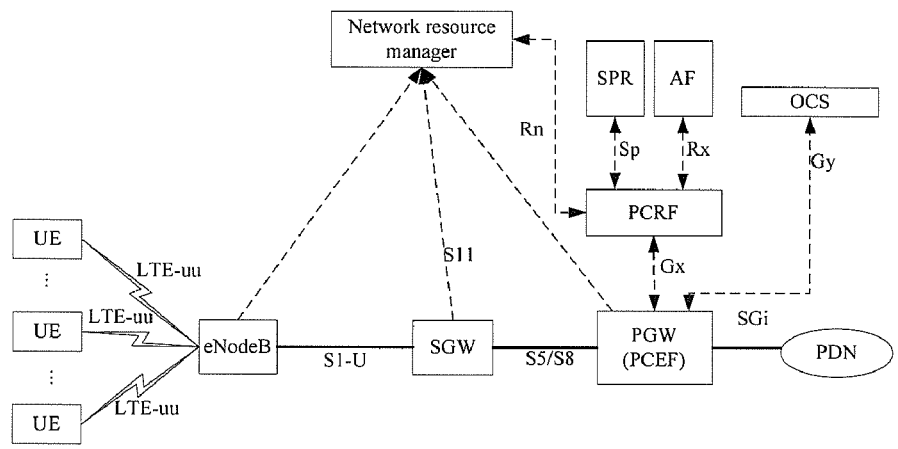
FIG. 1 is a schematic diagram illustrating a policy and charging control architecture based on network resource utilization information according to an embodiment of the present invention.

FIG. 1 is a schematic diagram illustrating a policy and charging control architecture based on network resource utilization information according to an embodiment of the present invention.

FIG. 1 illustrates in an exemplary manner a plurality of user equipments (UE), an eNodeB, a signaling gateway (SGW), a packet gateway (PGW), a packet data network (PDN), a network resource manager, a policy and charging rule function (PCRF), a subscriber profile repository (SPR), an application function (AF), and an online charging server (OCS). Those of ordinary skills in the art would understand that the policy and charging control architecture in FIG. 1 may include other network equipments and/or functions, which are omitted for conciseness.

The plurality of user equipments are under the control of the eNodeB and communicate with the eNodeB through LTE-uu interface. The eNodeB communicates with the signaling gateway through S1-U interface. The signaling gateway communicates with the packet gateway through S5/S8 interface. The packet gateway communicates with the packet data network through SGi interface. The policy and charging rule function communicates with the subscriber profile repository through Sp interface, and communicates with the application function through Rx interface. The above interfaces and communication manners between network equipment/functions have been defined in the existing protocols, and thus no further description is provided herein.

Because the present invention introduces the network resource manager which retrieves network resource utilization information from the eNodeB and/or the signaling gateway and/or the packet gateway and notifies the policy and charging rule function of the information for policy and charging control, an S11 interface and an Rn interface are defined in the present invention. The S11 interface is utilized to enable communication between the network resource manager and the eNodeB/signaling gateway/packet gateway such that network resource utilization information can be collected. And the Rn interface is utilized to enable communication between the policy and charging rule function and the network resource manager such that the network resource utilization information can be retrieved.

Moreover, the existing Gx interface for communication between the policy and charging rule function and the packet gateway (the policy and charging enforcement function) is extended in the present invention such that the credit control answer message transmitted to the policy and charging enforcement function by the policy and charging rule function can include the network resource utilization information. Similarly, the existing Gy interface for communication between the policy and charging enforcement function and the online charging server is extended such that the credit control request message transmitted to the online charging server by the policy and charging enforcement function can include the network resource utilization information.

Hereinafter is described in connection with the flowchart in FIG. 2 and the architectural diagram in FIG. 1 a solution for policy and charging control based on the network resource utilization information in the process of establishing an IP-CAN bearer according to an embodiment of the present invention.

Figure 2:
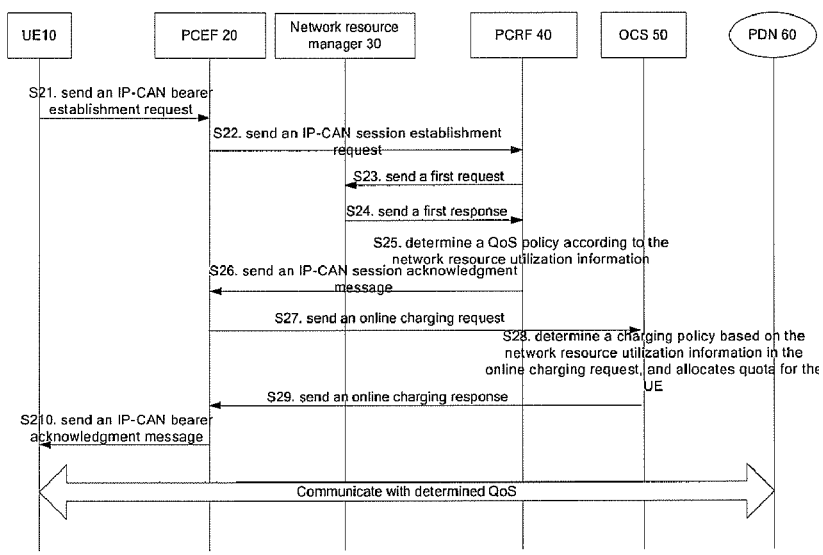
FIG. 2 is a flowchart illustrating a policy and charging control method based on network resource utilization information in the process of establishing an IP-CAN bearer according to an embodiment of the present invention.

Please refer to FIG. 2. When a user equipment 10 wants to access a packet data network 60, firstly in step S21, the user equipment 10 sends an IP-CAN (IP Connectivity Access Network) bearer establishment request to a policy and charging enforcement function 20 via the eNodeB and the signaling gateway (not shown), respectively. Please refer to 3GPP 23.203 for how the user equipment 10 sends the IP-CAN bearer establishment request to the policy and charging enforcement function 20 via the eNodeB and the signaling gateway, which is omitted for conciseness.

After the policy and charging enforcement function 20 receives the IP-CAN bearer establishment request from the user equipment 10, in step S22, the policy and charging enforcement function 20 sends an IP-CAN session establishment request (credit control request message) to a policy and charging rule function 40 via the Gx interface.

After the policy and charging rule function 40 receives the IP-CAN session establishment request from the policy and charging enforcement function 20, in step S23, the policy and charging rule function 40 sends a first request to a network resource manager 30 via the Rn interface. The first request is utilized to request the network resource utilization information from the network resource manager 30. The first request may include an identifier of the user equipment 10, service requested by the user equipment 10, address information of the signaling gateway, and address information of the packet gateway.

After the network resource manager 30 receives the first request from the policy and charging rule function 40, in step S24, the network resource manager 30 sends a first response to the policy and charging rule function 40 via the Rn interface. The first response includes collected network resource utilization information of the current network.

In particular, the network resource manager 30 may periodically send information collection message to the eNodeB and/or signaling gateway and/or packet gateway to collect the network resource utilization information via the R11 interface. Upon reception of the information collection message, the eNodeB sends current air channel utilization information to the network resource manager 30 via the R11 interface. Upon reception of the information collection message, the signaling gateway sends current signaling gateway bandwidth utilization information to the network resource manager 30 via the R11 interface. Upon reception of the information collection message, the packet gateway sends current packet gateway bandwidth utilization information to the network resource manager 30 via the R11 interface. The network resource manager 30 determines network resource utilization information of the current network according to the information fed back from the eNodeB and/or signaling gateway and/or packet gateway. After receiving the first request from the policy and charging rule function 40, the network resource manager 30 sends the determined network resource utilization information of the current network to the policy and charging rule function 40 through a first response.

Of course, the eNodeB and/or signaling gateway and/or packet gateway may as well positively and periodically provide the network resource manager 30 with the current air channel utilization information and/or signaling gateway bandwidth utilization information and/or packet gateway bandwidth utilization information via R11 interfaces. And the network resource manager 30 determines the network resource utilization information of the current network according to such information. After receiving the first request from the policy and charging rule function 40, the network resource manager 30 sends the determined network resource utilization information of the current network to the policy and charging rule function 40 through a first response.

Note that the network resource utilization information is not limited to the contents listed above and may include information such as resource utilization information of the user equipment 10 and resource utilization information of the service requested by the user equipment 10, etc.

After the policy and charging rule function 40 receives the first response from the network resource manager 30, in step S25, the policy and charging rule function 40 determines a QoS policy according to the network resource utilization information in the first response. Note that the policy and charging rule function 40 determines the QoS policy based on the network resource utilization information in combination with the existing input information. Therefore, determination of QoS policies becomes more flexible.

For example, if the network resource utilization information indicates that radio resource utilization of the current eNodeB is low, the policy and charging rule function 40 may determine a better QoS to attract more user equipments to use network resources. And if the network resource utilization information indicates that radio resource utilization of the current eNodeB is high, the policy and charging rule function 40 may determine a downgraded QoS to limit the number of user equipments using the network resources and thereby avoid network congestion.

For another example, if the network resource utilization information indicates that some specific data service utilization (such as YouTube) is so high that it may impact normal services (e.g. emergency service), the policy and charging rule function 40 may determine a downgraded QoS.

It can be understood that if the policy and charging rule function 40 doesn't contain information associated with subscription of the user equipment 10, before step S25, the policy and charging rule function 40 may send a profile request to the subscriber profile repository to retrieve information associated with the IP-CAN session. This has been defined in the existing 3GPP 23.203 and thus its description is omitted for conciseness.

After the policy and charging rule function 40 determines the QoS policy, in step S26, the policy and charging rule function 40 sends an IP-CAN session establishment acknowledgment message (credit control answer message) to the policy and charging enforcement function 20 via the Gx interface. The IP-CAN session establishment acknowledgment message includes the QoS policy and the network resource utilization information.

After the policy and charging enforcement function 20 receives the IP-CAN session establishment acknowledgment message, it may perform the QoS policy according to the QoS policy in the IP-CAN session establishment acknowledgment message.

Optionally, if the user equipment 10 is based on online charging, in step S27, the policy and charging enforcement function 20 sends an online charging request (credit control request message) to an online charging server 50 via the Gy interface. The online charging request includes network resource utilization information.

After the online charging server 50 receives the online charging request from the policy and charging enforcement function 20, in step S28, the online charging server 50 determines a charging policy based on the network resource utilization information in the online charging request, and allocates quota for the service requested by the user equipment 10 according to remaining credit of the user equipment 10 and the determined charging policy. Note that the online charging server 50 determines the charging policy based on the network resource utilization information in combination with, for example, subscriber information, or subscriber location information. Therefore, determination of charging policies becomes more flexible.

For example, if the network resource utilization information indicates that radio resource utilization of the current eNodeB is low, the online charging server 50 may determine a cheaper discounted tariff plan to attract more user equipments to use network resources. And if the network resource utilization information indicates that radio resource utilization of the current eNodeB is high, the online charging server 50 may determine a more expensive tariff plan to limit the number of user equipments using the network resources and thereby avoid network congestion.

Then in step S29, the online charging server 50 sends the allocated quota in the form of an online charging response (credit control answer message) to the policy and charging enforcement function 20 via the Gy interface.

Upon reception of the online charging response, in step S210, the policy and charging enforcement function 20 sends an IP-CAN bearer establishment acknowledgment message to the user equipment 10.

In this way, the user equipment 10 successfully accesses the packet data network 60, and performs transmission of service data streams with the determined QoS.

Optionally, the Gy interface may be further extended in the present invention such that the online charging server 50 may set a new resource utilization information change trigger in the online charging response for the policy and charging enforcement function 20 to monitor the change of the network resource utilization.

When the network resource utilization changes, the policy and charging rule function 40 may update the QoS policy according to the updated network resource utilization information, and/or the online charging server 50 may update the charging policy according to the updated network resource utilization information.

It should be noted that the above description is provided in connection with FIG. 2, taking the user equipment 10 based on online charging as an example. In an alternative embodiment, if the user equipment 10 is based on offline charging, then after step S26, the policy and charging enforcement function 20 sends an offline charging request to an offline charging server. The offline charging request includes network resource utilization information based on which the offline charging server determines an offline charging policy.

Hereinafter is described in connection with the flowchart in FIG. 3 and the architectural diagram in FIG. 1 a solution for updating policy and charging control based on updated network resource utilization information according to an embodiment of the present invention.

Figure 3:
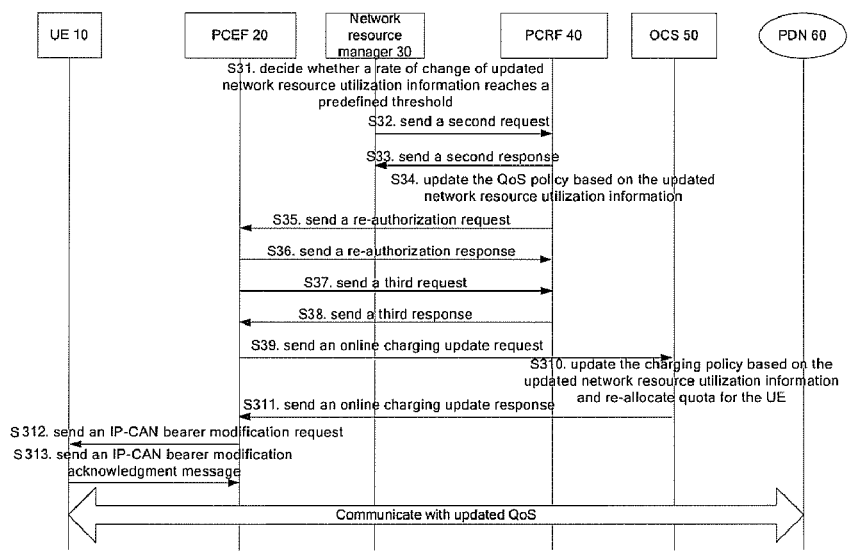
FIG. 3 is a flowchart illustrating a method of updating policy and charging control based on updated network resource utilization information according to an embodiment of the present invention.

Please refer to FIG. 3. Firstly, in step S31, a network resource manager 30 judges whether a rate of change of updated network resource utilization information reaches a predefined threshold according to the collected network resource utilization information. For example, if the network resource utilization information varies from 20% to 80%, it can be decided that the rate of change of updated network resource utilization information reaches a predefined threshold.

In particular, the network resource manager 30 may periodically send an information collection message to the eNodeB and/or signaling gateway and/or packet gateway to collect the network resource utilization information. Upon reception of the information collection message, the eNodeB sends current air channel utilization information to the network resource manager 30 via an R11 interface. Upon reception of the information collection message, the signaling gateway sends current signaling gateway bandwidth utilization information to the network resource manager 30 via an R11 interface. And upon reception of the information collection message, the packet gateway sends current packet gateway bandwidth utilization information to the network resource manager 30 via an R11 interface. The network resource manager 30 determines updated network resource utilization information according to information fed back from the eNodeB and/or signaling gateway and/or packet gateway, and judges whether the updated network resource utilization information reaches a predefined threshold.

Of course, the eNodeB and/or signaling gateway and/or packet gateway may as well positively and periodically provide the network resource manager 30 with the current air channel utilization information and/or signaling gateway bandwidth utilization information and/or packet gateway bandwidth utilization information via R11 interfaces. The network resource manager 30 determines the updated network resource utilization information of the current network according to such information and judges whether the updated network resource utilization information reaches a predefined threshold.

If the rate of change of the updated network resource utilization information reaches a predefined threshold, in step S32, the network resource manager 30 sends a second request to the policy and charging rule function 40 via an Rn interface. The second request includes the updated network resource utilization information.

After the policy and charging rule function 40 receives the second request, in step S33, the policy and charging rule function 40 sends a second response to the network resource manager 30 via an Rn interface. The second response is utilized to acknowledge reception of the updated network resource utilization information.

Then in step S34, the policy and charging rule function 40 updates the QoS policy based on the updated network resource utilization information.

For example, if the updated network resource utilization information indicates that radio resource utilization of the current eNodeB decreases, the policy and charging rule function 40 may appropriately upgrade QoS. And if the updated network resource utilization information indicates that radio resource utilization of the current eNodeB increases, the policy and charging rule function 40 may appropriately downgrade QoS.

Then in step S35, the policy and charging rule function 40 sends a re-authorization request to the policy and charging enforcement function 20.

Upon reception of the re-authorization request, in step S36, the policy and charging enforcement function 20 sends a re-authorization response (re-authorization answer) to the policy and charging rule function 40.

And then in step S37, the policy and charging enforcement function 20 sends a third request (credit control request message) to the policy and charging rule function 40 via a Gx interface to request an updated QoS policy.

Upon reception of the third request, in step S38, the policy and charging rule function 40 sends a third response (credit control answer message) to the policy and charging enforcement function 20 via the Gx interface. The third response includes the updated QoS policy and the updated network resource utilization information.

After receiving the third response, the policy and charging enforcement function 20 may perform the updated QoS policy according to the updated QoS policy in the third response.

After monitoring the change of the network resource utilization, the policy and charging enforcement function 20 activates the new resource utilization information change trigger and in step S39 sends an online charging update request (credit control request message) to an online charging server 50 via a Gy interface. The online charging update request includes the updated network resource utilization information.

After the online charging server 50 receives the online charging update request, in step S310, the online charging server 50 updates the charging policy based on the updated network resource utilization information in the online charging update request, and re-allocates quota for the service requested by the user equipment 10 according to remaining credit of the user equipment 10 and the updated charging policy. Note that the online charging server 50 updates the charging policy based on the updated network resource utilization information in combination with, for example, subscriber information, or subscriber location information.

For example, if the network resource utilization information indicates that radio resource utilization of the current eNodeB decreases, the online charging server 50 may appropriately increase the charging discount. And if the network resource utilization information indicates that radio resource utilization of the current eNodeB increases, the online charging server 50 may appropriately decrease the charging discount.

Then in step S311, the online charging server 50 sends the re-allocated quota in the form of an online charging update response (credit control answer message) to the policy and charging enforcement function 20 via the Gy interface.

Upon reception of the online charging update response, in step S312, the policy and charging enforcement function 20 sends an IP-CAN bearer modification request to the user equipment 10 via the signaling gateway and the eNodeB (not shown), respectively.

Upon reception of the IP-CAN bearer modification request, in step S313, the user equipment 10 sends an IP-CAN bearer modification acknowledgment message to the policy and charging enforcement function 20 via the eNodeB and the signaling gateway (not shown), respectively.

In this way, the user equipment 10 may perform transmission of service data streams with the updated QoS with the packet data network 60.

It should be noted that the above description is provided in connection with FIG. 3, taking the user equipment 10 based on online charging as an example. In a varied embodiment, if the user equipment 10 is based on offline charging, then after step S38, the policy and charging enforcement function 20 sends an offline charging update request to an offline charging server. The offline charging update request includes updated network resource utilization information based on which the offline charging server updates the offline charging policy.

Hereinafter is described in connection with the flowchart in FIG. 4 and the architectural diagram in FIG. 1 a method of terminating an IP-CAN bearer according to an embodiment of the present invention.

Figure 4:
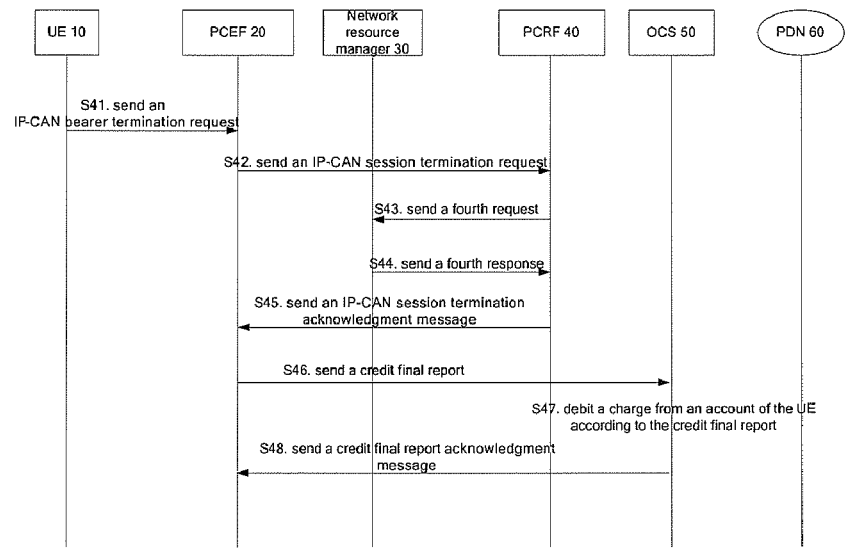
FIG. 4 is a flowchart illustrating a method of terminating an IP-CAN bearer according to an embodiment of the present invention.

Please refer to FIG. 4. When the user equipment 10 wants to terminate its IP-CAN connection with the packet data network 60, firstly in step S41, the user equipment 10 sends an IP-CAN bearer termination request to the policy and charging enforcement function 20 via the eNodeB and the signaling gateway (not shown), respectively.

Upon reception of the IP-CAN bearer termination request, in step S42, the policy and charging enforcement function 20 sends an IP-CAN session termination request (credit control request message) to the policy and charging rule function 40 via the Gx interface.

Upon reception of the IP-CAN session termination request, in step S43, the policy and charging rule function 40 removes QoS policies associated with the IP-CAN session, and sends a fourth request to the network resource manager 30 via the Rn interface. The fourth request is utilized to request the network resource manager 30 to terminate notification of updated network resource utilization information to the policy and charging rule function 40.

Upon reception of the fourth request, in step S44, the network resource manager 30 sends a fourth response to the policy and charging rule function 40 via the Rn interface. The fourth response is utilized to acknowledge termination of notification of updated network resource utilization information to the policy and charging rule function 40.

Upon reception of the fourth response, in step S45, the policy and charging rule function 40 sends an IP-CAN session termination acknowledgment message (credit control answer message) to the policy and charging enforcement function 20 via the Gx interface.

Upon reception of the IP-CAN session termination acknowledgment message, in step S46, the policy and charging rule function 20 removes QoS policies associated with the IP-CAN session, and sends a credit final report to the online charging server 50 via the Gy interface.

Upon reception of the credit final report, in step S47, the online charging server 50 debits a charge from an account of the user equipment 10 according to the credit final report.

Then in step S48, the online charging server 50 sends a credit final report acknowledgment message to the policy and charging enforcement function 20 via the Gy interface, and terminates the online charging session.

Note that in the present invention, the network resource manager 30 may be an independent network equipment/function, or be integrated into other network equipment/functions. For example, the network resource manager 30 may be integrated into the operator performance management center or the policy and charging rule function.

The technical solutions of the present invention are described above from the method/step perspective. These solutions will be further described from the apparatus/module perspective hereinafter.

According to an embodiment of the present invention, there is provided an apparatus for retrieving and performing a QoS policy in a policy and charging enforcement function of a communication network. The apparatus includes: a first sending device for sending an IP-CAN session establishment request to a policy and charging rule function in response to an IP-CAN bearer establishment request from a user equipment; a first receiving device for receiving an IP-CAN session establishment acknowledgment message from the policy and charging rule function, wherein the IP-CAN session establishment acknowledgment message comprises network resource utilization information and the QoS policy determined according to the network resource utilization information; a first performing device for performing the QoS policy; a second sending device for sending an IP-CAN bearer establishment acknowledgment message to the user equipment.

If the user equipment is based on online charging, the apparatus may further include: a third sending device for sending an online charging request to an online charging server, wherein the online charging request includes the network resource utilization information; a second receiving device for receiving an online charging response from the online charging server, wherein the online charging response includes quota allocated for the service requested by the user equipment.

According to another embodiment of the present invention, there is provided an apparatus for determining a QoS policy in a policy and charging rule function of a communication network. The apparatus includes: a fourth sending device for sending a first request to a network resource manager in response to an IP-CAN session establishment request from a policy and charging enforcement function, wherein the first request is utilized to request network resource utilization information; a third receiving device for receiving a first response from the network resource manager, wherein the first response comprises the network resource utilization information; a first determining device for determining the QoS policy based on the network resource utilization information in the first response; a fifth sending device for sending an IP-CAN session establishment acknowledgment message to the policy and charging enforcement function, wherein the IP-CAN session establishment acknowledgment message includes the QoS policy and the network resource utilization information.

According to another embodiment of the present invention, there is provided an apparatus for providing network resource utilization information in a network resource manager of a communication network. The apparatus includes: a fourth receiving device for receiving a first request from a policy and charging rule function, wherein the first request is utilized to request the network resource utilization information; and a sixth sending device for sending the collected network resource utilization information to the policy and charging rule function via a first response.

According to another embodiment of the present invention, there is provided an apparatus for determining a charging policy in an online charging server of a communication network. The apparatus includes: a fifth receiving device for receiving an online charging request from a policy and charging enforcement function, wherein the online charging request comprises network resource utilization information; a second determining device for determining the charging policy based on the network resource utilization information in the online charging request; a first allocating device for allocating quota for service requested by a user equipment based on remaining credit of the user equipment and the charging policy; and a seventh sending device for sending the allocated quota to the policy and charging enforcement function via an online charging response.

It is obvious to those skilled in the art that the present invention is not limited to the details of the above exemplary embodiments and may be otherwise implemented without departing from the spirits or fundamental features of the present invention. Therefore, the embodiments are, by all means, exemplary and non-limiting. The scope of the present invention is defined by the appended claims instead of the above description. Consequently, the present invention is intended to cover any variation to equivalent elements of the claims. And any reference sign in any claim should not be interpreted to be a limitation to the related claim. In addition, obviously, any form of "comprise" doesn't exclude other units or steps, and a singular doesn't exclude the possibility that there might be two or more. Several units or devices stated in a system claim may also be implemented as a single unit or device by means of software or hardware. Such words as "first", "second", etc., are utilized to identify names, and don't imply any particular order.

The invention claimed is:

1. A method of retrieving and performing a QoS policy in a policy and charging enforcement function of a communication network, the method comprising:
    sending an IP-CAN session establishment request to a policy and charging rule function in response to an IP-CAN bearer establishment request from a user equipment;
    receiving an IP-CAN session establishment acknowledgment message from the policy and charging rule function, wherein the IP-CAN session establishment acknowledgment message comprises network resource utilization information and a QoS policy determined according to the network resource utilization information;
    performing the QoS policy;
    sending an IP-CAN bearer establishment acknowledgment message to the user equipment.

2. The method of claim 1, wherein after performing the QoS policy and before sending an IP-CAN bearer establishment acknowledgment message to the user equipment, the method further comprises:
    sending an online charging request to an online charging server and receiving an online charging response from the online charging server, if the user equipment is based on online charging, wherein the online charging request comprises the network resource utilization information and the online charging response comprises quota allocated for the service requested by the user equipment;
    sending an offline charging request to an offline charging server for determining an offline charging policy, if the user equipment is based on offline charging, wherein the offline charging request comprises the network resource utilization information.

3. The method of claim 2, further comprising:
    receiving a response from the policy and charging rule function, wherein the response comprises an updated QoS policy and updated network resource utilization information;
    performing the updated QoS policy;
    sending an online charging update request to the online charging server and receiving an online charging update response from the online charging server, if the user equipment is based on online charging, wherein the online charging update request comprises the updated network resource utilization information and the online charging update response comprises quota allocated for the service requested by the user equipment;
    sending an offline charging update request to the offline charging server for updating the offline charging policy, if the user equipment is based on offline charging, wherein the offline charging update request comprises the updated network resource utilization information;
    sending an IP-CAN bearer modification request to the user equipment;
    receiving an IP-CAN bearer modification acknowledgment message from the user equipment.

4. The method of claim 3, before receiving a response from the policy and charging rule function, wherein the response comprises an updated QoS policy and updated network resource utilization information, wherein the method further comprises:
    receiving a re-authorization request from the policy and charging rule function;
    sending a re-authorization response to the policy and charging rule function;
    sending a third request to the policy and charging rule function to request the updated QoS policy.

5. The method of claim 3, further comprising:
    sending an IP-CAN session termination request to the policy and charging rule function in response to an IP-CAN bearer termination request from the user equipment;
    receiving an IP-CAN session termination acknowledgment message from the policy and charging rule function;
    removing QoS policies associated with the IP-CAN session;
    sending a credit final report to the online charging server;
    receiving a credit final report acknowledgment message from the online charging server.

6. A method of determining a QoS policy in a policy and charging rule function of a communication network, the method comprising:
    sending a first request to a network resource manager in response to an IP-CAN session establishment request from a policy and charging enforcement function, wherein the first request is utilized to request network resource utilization information;
    receiving a first response from the network resource manager, wherein the first response comprises the network resource utilization information;
    determining the QoS policy based on the network resource utilization information in the first response;
    sending an IP-CAN session establishment acknowledgment message to the policy and charging enforcement function, wherein the IP-CAN session establishment acknowledgment message comprises the QoS policy and the network resource utilization information.

7. The method of claim 6, further comprising:
    receiving a request from the network resource manager, wherein the request comprises updated network resource utilization information;
    sending a response to the network resource manager to acknowledge reception of the updated network resource utilization information;
    updating the QoS policy based on the updated network resource utilization information;
    sending a response to the policy and charging enforcement function, wherein the response comprises the updated QoS policy and the updated network resource utilization information.

8. The method of claim 7, after updating the QoS policy based on the updated network resource utilization information and before sending a response to the policy and charging enforcement function, wherein the response comprises the updated QoS policy and the updated network resource utilization information, the method further comprises:
    sending a re-authorization request to the policy and charging enforcement function;
    receiving a re-authorization response from the policy and charging enforcement function;

receiving a third request from the policy and charging enforcement function, wherein the third request is utilized to request the updated QoS policy.

9. The method of claim 7, further comprising:

receiving an IP-CAN session termination request from the policy and charging enforcement function and removing QoS policies associated with the IP-CAN session;

sending a fourth request to the network resource manager, wherein the fourth request is utilized to request termination of notification of updated network resource utilization information;

receiving a fourth response from the network resource manager, wherein the fourth response is utilized to acknowledge the termination of notification of updated network resource utilization information;

sending an IP-CAN session termination acknowledgment message to the policy and charging enforcement function.

* * * * *